(12) United States Patent
Machamer et al.

(10) Patent No.: US 7,438,366 B2
(45) Date of Patent: Oct. 21, 2008

(54) REPLACEMENT WHEEL AND CONTACT RING THEREFOR

(75) Inventors: David L. Machamer, Malvern, PA (US); Larry K. Rogers, Bordentown, NJ (US); Jinjun Wang, Plainsboro, NJ (US)

(73) Assignee: Hutchinson SA., Paris (FR)

( * ) Notice: Subject to any disclaimer, the term of this patent is extended or adjusted under 35 U.S.C. 154(b) by 197 days.

(21) Appl. No.: 11/346,465

(22) Filed: Feb. 2, 2006

(65) Prior Publication Data

US 2007/0176481 A1     Aug. 2, 2007

(51) Int. Cl.
*B60B 25/00* (2006.01)
*B60C 15/02* (2006.01)

(52) U.S. Cl. .................. 301/35.629; 301/10.1; 152/396

(58) Field of Classification Search ............... 301/9.1, 301/10.1, 11.1–11.3, 14, 30, 35.51, 35.628–35.629; 152/396–399
See application file for complete search history.

(56) References Cited

U.S. PATENT DOCUMENTS

| | | | |
|---|---|---|---|
| 1,769,903 A | | 7/1930 | Baker |
| 1,965,204 A | * | 7/1934 | Sinclair ............... 301/10.1 |
| 2,107,925 A | * | 2/1938 | Ash .................... 301/36.1 |
| 2,195,590 A | * | 4/1940 | Eksergian ............ 301/36.1 |
| 2,283,860 A | | 5/1942 | Manning |
| 2,590,363 A | | 3/1952 | Adair |
| 3,494,669 A | | 2/1970 | Reppert |
| 3,820,851 A | | 6/1974 | Longo et al. |
| 3,834,766 A | | 9/1974 | Thousand |
| 4,043,374 A | * | 8/1977 | Smith ................. 152/405 |
| 4,505,314 A | * | 3/1985 | Goudy ................ 152/398 |
| 4,950,036 A | | 8/1990 | Patti |
| 4,989,657 A | * | 2/1991 | Lipper ................ 152/399 |
| 5,271,665 A | | 12/1993 | O'Coin |
| 5,362,134 A | | 11/1994 | Carmona |
| 6,238,009 B1 | * | 5/2001 | Lovitt, Jr. ............ 301/35.629 |
| 6,374,493 B1 | | 4/2002 | Howald |
| 6,626,502 B1 | | 9/2003 | Petrak |
| 6,685,275 B2 | | 2/2004 | Gorges et al. |
| 2003/0062761 A1 | | 4/2003 | Gorges et al. |
| 2004/0169414 A1 | | 9/2004 | Roberts |

OTHER PUBLICATIONS

Accuride, "Light Truck Wheels—Hub-Piloted Dual-Mounting Use Clamping Plate W/90 Cone Nuts," Date Unknown, 2 Pages.

(Continued)

*Primary Examiner*—Jason R Bellinger
(74) *Attorney, Agent, or Firm*—Clement A Berard, Esq; Dann, Dorfman, Herrell & Skillman (57) ABSTRACT

A replacement wheel, wheel disc or object is adapted to substantially replicate a mounting pad pattern of a wheel, wheel disc or object to be replaced. An annular arrangement of raised mounting pads provides a pattern of mounting pads proximate a circle of a given diameter to substantially replicate the mounting pad pattern of the to-be-replaced wheel disc or objects Mounting pads may be provided on an annular member having an inner diameter less than the given diameter of a circle at which the mounting pad pattern of the to-be-replaced wheel disc or object is located and having an outer diameter greater than the given diameter. Mounting pads may be provided by inserts.

30 Claims, 5 Drawing Sheets

OTHER PUBLICATIONS

Alcoa Wheel Products, "Stud Located Ball Seat Mounting System," http://www.alcoa.com/alcoawheels/north_america/en/product_info_page.asp?info_id=. . . , Printed Aug. 4, 2005, 2 Pages.

Alcoa Wheel Products, "Hub Piloted Mounting System," http://www.alcoa.com/alcoawheels/north_america/en/product_info_page.asp?info_page_id=. . . , Printed Aug. 4, 2005, 2 Pages.

Sae International, Surface Vehicle Recommended Practice, SAE-J393, "(R) Nomenclature—Wheels, Hubs, And Rims For Commercial Vehicles," Issued Jun. 1969, Revised Jul. 2001, Copyright 2001, 11 Pages.

Sae International, Surface Vehicle Recommended Practice, SAE-J694, "Disc Wheels/Hub Or Drum Interface Dimensions—Commercial Vehicles," Issued May 1955, Revised Feb. 2001, Copyright 2001, 17 Pages.

Sae International, Surface Vehicle Recommended Practice, SAE-J1982, "(R) Nomenclature—Wheels For Passenger Cars, Light Trucks And Multipurpose Vehicles," Issued Dec. 1991, Revised Aug. 1998, Copyright 1998, 7 Pages.

* cited by examiner

REPLACEMENT WHEEL AND CONTACT RING THEREFOR

The present invention relates to a replacement wheel and contact ring therefor.

A wheel for a motor vehicle comprises a wheel disc that mounts to a rotatable hub of a vehicle and a rim attached to the wheel disc for supporting a tire. A conventional wheel for a motor vehicle has a pattern of holes (mounting bolt circle) through which threaded studs or bolts pass for securing the wheel to a vehicle hub. A conventional stamped steel motor vehicle wheel, for example, of the sort that is typically provided as original equipment by the vehicle manufacturer, also has a pattern of raised areas (mounting pads) that make contact with and bear against the vehicle hub when the lug nuts or lug bolts are tightened to secure the wheel to the hub. Patterns of bolts and bolt holes are typically standardized, for example, as by Society of Automotive Engineers (SAE) Surface Vehicle Recommended Practice document SAE J694, "Disc Wheel/Hub or Drum Interface Dimensions—Commercial Vehicles," by the International Standards Organization (ISO) standard ISO-4107, and/or by other standards and/or practices.

The patterns of mounting pads and the mounting bolt circle in combination provide certain desirable characteristics, such as springiness and resistance to loosening of the bolts or lug nuts that secure the wheel to the hub when the wheel is mounted to the vehicle hub. In use, however, dirt and debris tend to accumulate between the wheel and the hub in the spaces other than where the mounting pads contact and bear against the vehicle hub, especially where the vehicle is driven "off road," e.g., on a beach or desert, or in another dirty or dusty environment, as is common for sport utility vehicles, emergency vehicles, military vehicles and other government services vehicles.

From time to time wheels are replaced, e.g., as tires wear or fail, or otherwise to utilize a replacement wheel, or to "upgrade" from an original wheel to a specialty wheel. So long as the replacement wheel has the same bolt circle and mounting pad pattern as the original wheel, there is no problem even if there is dirt and debris on the hub because the mounting pads of the replacement wheel contact and bear against the hub at the same locations as did the replaced wheel, i.e. in locations that are generally free of dirt and debris because the mounting pads of the replaced wheel were in contact with the hub.

A problem arises, however, if the replacement wheel has a different mounting pad arrangement (size and/or location) from that of the replaced wheel or has a flat mounting surface. When such replacement wheel is mounted to the vehicle hub, it contacts the hub at locations that have dirt and other debris so that proper contact between the wheel and the hub is not made. As a result, the wheel-to-hub alignment may be improper and/or the mounting bolts or lug nuts may not remain properly torqued which can lead to a loose wheel and to failure of the lug bolts or studs.

The problems of a dirty hub may occur, for example, where an aluminum or magnesium replacement wheel, which usually has a flat wheel disc, replaces a stamped steel wheel, as is often the case for sport utility vehicles and other off-road vehicles. This problem can also arise where replacement wheels may be provided by different manufacturers, or where wheels from different models of vehicles may have the same mounting bolt circle but different mounting pads, or where improved replacement wheels become available. The Humvee military vehicle is one example of a vehicle that has experienced one or more of the foregoing circumstances regarding its wheels.

Conventionally, this problem may be overcome by cleaning the vehicle hub to remove the dirt and debris before the replacement wheel is installed. However, cleaning can take substantial time and requires the availability of cleaning materials such as solvents, wire brushes, and rags or other wipes, which may not be conveniently available. In particular, cleaning is not only undesirable, but can be dangerous, as in the case of emergency and military vehicles where delay, particularly delay in a fixed location, can jeopardize life and limb.

In general, various prior art wheels, wheel spacers, adapters and extenders are known that have flat mounting surfaces, except in some cases there are bores or recesses for the lug nuts, but none address the problem of providing a proper mounting for a replacement wheel that has a different mounting pad arrangement than that of a replaced wheel. Some prior art devices mount between a wheel and a hub, and others mount between dual wheels.

Thus, there is a need for an arrangement that would permit a replacement wheel having a different mounting pad pattern or no mounting pads to be properly mounted to a vehicle hub in place of a replaced wheel, without the need for careful cleaning or otherwise preparing the vehicle hub.

To this end, a replacement wheel, wheel disc or object is adapted to substantially replicate a mounting pad pattern of a wheel, wheel disc or object to be replaced. An annular arrangement provides a pattern of raised mounting pads proximate a circle of a given diameter to substantially replicate the mounting pad pattern of the to-be-replaced wheel disc or objects Mounting pads may be provided on an annular member having an inner diameter less than the given diameter of a circle at which the mounting pad pattern of the to-be-replaced wheel disc or object is located and having an outer diameter greater than the given diameter. Mounting pads may be provided by inserts.

BRIEF DESCRIPTION OF THE DRAWING

The detailed description of the preferred embodiment(s) will be more easily and better understood when read in conjunction with the FIGURES of the Drawing which include.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED EMBODIMENT(S)

In the Society of Automotive Engineers (SAE) standard nomenclature as described in SAE Surface Vehicle Recommended Practice documents, e.g., such as SAE J393, "Nomenclature—Wheels, Hubs and Rims for Commercial Vehicles" and SAE J1982, "Nomenclature—Wheels for Passenger Cars, Light Trucks, and Multipurpose Vehicles," the "wheel" is the rotating load-carrying member between the tire and the hub, i.e. the wheel supports the tire and is attachable to the vehicle hub. The wheel includes a "rim" on which a tire is mounted and a "wheel disc" that is the supporting member between the hub and the rim, i.e. the rotating member that may be attached to the hub.

"Mounting pad" is the SAE nomenclature for raised regions (also known as (a.k.a.) "bumps" and "nubbins") on a vehicle wheel disc that are in contact with the hub of the vehicle when the wheel is attached thereto. Typically, an original vehicle wheel is stamped (e.g., steel) and has a pattern of mounting pads stamped therein. Mounting pads that are outside of the pitch circle diameter of the bolt holes (the "bolt circle diameter") are referred to as "outer" mounting pads and mounting pads that are inside the bolt circle diameter are referred to as "inner" mounting pads. The wheel disc is typically attached to the hub by studs (a.k.a. bolts or lugs) projecting from the hub and nuts (a.k.a. lug nuts) or by bolts (a.k.a. lug bolts) threaded into bolt holes in the hub. Nut configurations may include, e.g., cone seat nuts, ball seat nuts and flange nuts.

As used herein, a replacement wheel contact ring is an arrangement that is usable with a replacement wheel for a vehicle so that the replacement wheel with replacement wheel contact ring will have substantially the same arrangement of mounting pads (e.g., in location and size) as a to-be-replaced wheel. The to-be-replaced wheel may be, but need not be, an original wheel, i.e. a wheel provided by the vehicle manufacturer as original equipment. It is noted that every wheel inherently includes a wheel disc, whether the wheel disc is separable from the rim or is permanently affixed thereto or is integral therewith, and so references to wheel disc are also references to a wheel and references to a wheel are also references to a wheel disc.

A replacement wheel contact ring arrangement is for adapting a replacement wheel disc (or wheel) to substantially replicate a mounting pad pattern of a wheel disc (or wheel) to be replaced, wherein the mounting pad pattern of the to-be-replaced wheel disc (or wheel) is located thereon proximate a circle of given diameter, i.e. the circle of given diameter typically intersects some or all of the mounting pads, each of which have a portion that extends radially inwardly from the circle of given diameter, a portion that extends radially outwardly from the circle of given diameter, or portions that extend both radially inwardly and radially outwardly from the circle of given diameter. A replacement wheel contact ring arrangement is not intended to be between a lug nut and a wheel disc or between the head of a mounting bolt and the wheel disc, but is intended to be between the wheel disc and the vehicle hub (or between an inner wheel and the hub and/or between an outer wheel and an inner wheel on a dual wheel assembly).

Figure 1:
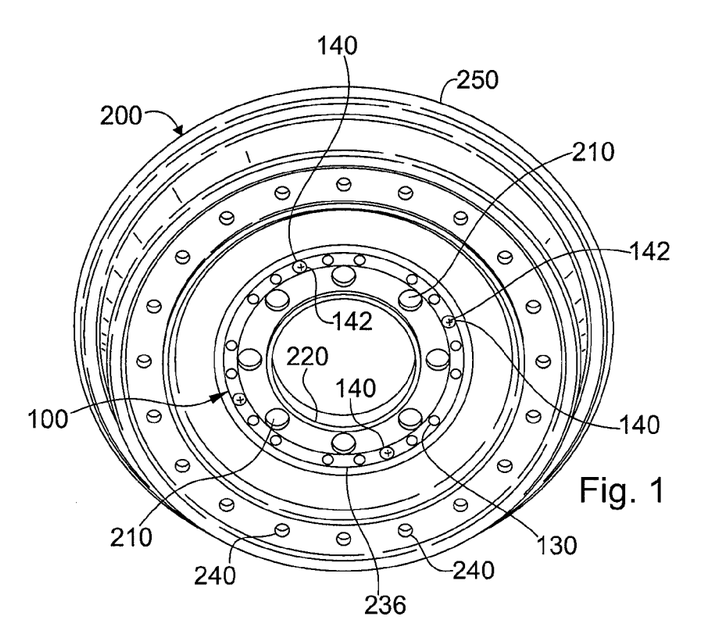
FIG. 1 is an example embodiment of a replacement wheel including a contact ring arrangement on the hub-facing side thereof.
Figure 2A:
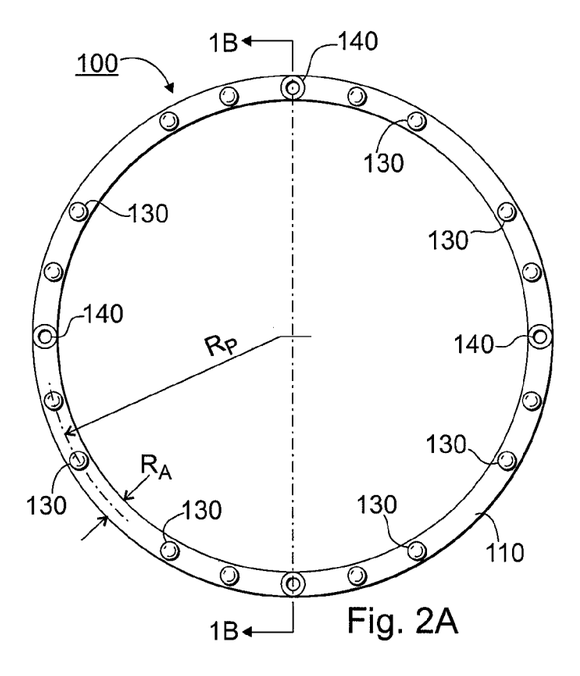
FIGS. 2A and 2B include a plan view and a side cross-sectional view of the replacement wheel contact ring of the example embodiment of FIG. 1.
Figure 2B:
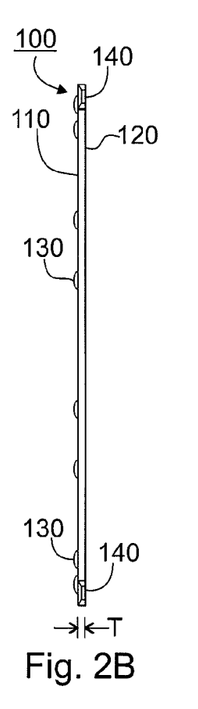
Figure 3:
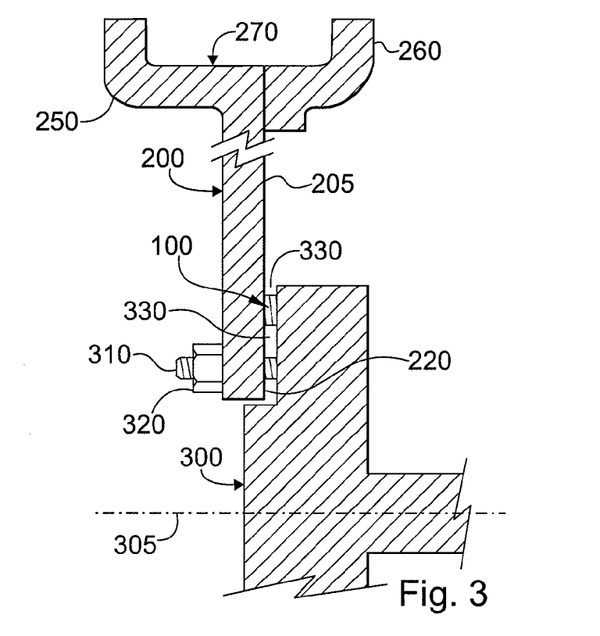
FIG. 3 is a cross-sectional view of the example wheel and replacement wheel contact ring as in FIGS. 1 and 2A-2B mounted to an example vehicle hub.

FIG. 1 is an example embodiment of a replacement wheel 200 including a contact ring arrangement 100 on the hub-facing side thereof, FIGS. 2A and 2B are a plan view and a side cross-sectional view of the replacement wheel contact ring 100 of the example embodiment of FIG. 1, and FIG. 3 is a cross-sectional view of the example wheel disc 200 and replacement wheel contact ring 100 as in FIG. 1 mounted to an example vehicle hub 300 having an axis of rotation 305.

The illustrated example wheel disc 200 has eight mounting bolt holes 210 on a mounting bolt circle, has an inner mounting pad 220, and has contact ring arrangement 100 mounted concentrically thereon, e.g., by screws or bolts through holes 140. As a replacement wheel disc, wheel disc 200 has a pattern of mounting pads 130 in a circle thereon corresponding to the mounting pads of a wheel disc to be replaced. Example wheel disc 200 includes a flange 250 that provides a portion of a rim for providing lateral support for a tire mounted thereon and has a circle of bolt holes 240 through which bolts attaching a rim ring are fastened, thereby to provide a complete rim for wheel 200. Wheel discs of the type illustrated are typically used with Humvee type vehicles.

Replacement wheel contact ring 100 is a generally flat annular member that has a plurality of raised mounting pads 130 in a predetermined pattern on a generally flat hub-facing side 110 thereof so as to substantially replicate the mounting pad pattern of a replaced wheel, and is generally flat on the hub-facing side 120 thereof. The mounting pads 130 of contact ring 100 are in a pattern on a circle of radius Rp which is substantially the same radius of the circle on which the mounting pads of the replaced wheel are disposed. Typically, mounting pads 130, which provide the primary bearing contacts with vehicle hub 300, and the mounting bolt or lugs 310, 320, which are the primary load bearing members securing wheel disc 200 to vehicle hub 300, can together provide a Belleville spring action that tends to reduce any tendency of the mounting bolts or lugs 320 to loosen under use conditions. Optionally, contact ring 100 includes, e.g., plural holes 140 through which screws, bolts, pins or rivets 142 may pass for attaching contact ring 100 to wheel disc 200.

The illustrated arrangement of mounting pads 130 on replacement wheel contact ring 100 is an example suitable for use, for example, with the illustrated example wheel disc 200 having eight mounting bolt holes 210 and a hub 300 having eight studs 310 disposed every 45° around a mounting bolt circle of diameter smaller than the diameter 2Rp, as is the case for a wheel for use on a Humvee vehicle. A Humvee hub has eight mounting studs 310 on a mounting bolt circle of radius 8.25 cm (about 3.25 inches) and a Humvee wheel disc 200 has eight mounting bolt holes 210 on a mounting bolt circle of the same diameter. Each pair of closely spaced mounting pads 130 is symmetrically disposed relative to one of the mounting holes 210 and mounting studs 310. Ring 100 has an annular radial width Ra that is at least as large as the radial dimension of mounting pads 130, and preferably is larger. Contact ring 100 has a thickness T that is sufficient to provide the desired strength and durability.

Replacement wheel contact ring 100 may be formed by stamping, embossing, punching, forging, machining, casting, or by any combination thereof, to form the pattern: of mounting pads 130. Contact ring 100 is typically formed of a metal, such as a steel, titanium, aluminum, or magnesium, but may be of any other material or combination of materials of suitable strength and durability. The example embodiment of FIGS. 1, 2A-2B and 3 is a basic contact ring 100 that may be attached to the replacement wheel by any suitable means, of which attachment screws passing through holes 140 are but one example.

One example replacement wheel contact ring 100 that is suitable for a Humvee wheel or wheel disc has a radius Rp of about 9.9 cm (about 3.9 inches), an annular radial width Ra of about 1.0 cm (about 0.4 inch) and a thickness of about 0.3 cm (about 0.125 inch), and is preferably made of steel. One example contact ring 100 is attached to a Humvee wheel disc by four flat-head screws 142.

Regions 330 in FIG. 3 illustrate example spaces between vehicle hub 300 and wheel disc 200 due to the height of mounting pads 130 of replacement wheel contact ring 100. Regions 330 are examples of areas where dirt and debris may accumulate in use. Because the mounting pads 130 of contact ring 100 of wheel 200 bear against and are in surface-to-surface contact with vehicle hub 300, dirt and debris do not accumulate there. Rim member 260 attaches to wheel disc 200 and cooperates with flange 250 to provide a rim 270, thereby to define a wheel.

Replacement wheel contact ring 100 when attached to the wheel disc 200 of the replacement wheel overcomes the problem of lug nuts that loosen in use by providing the replacement wheel 200 with substantially the same arrangement of mounting pads 130 as the replaced (e.g., original) wheel. As a result, the replacement wheel 200 with contact ring 100 will contact and bear against the vehicle hub 300 at substantially the same locations as the replaced wheel, which locations are usually relatively "clean" because they have been in surface-to-surface contact with the mounting pads of the replaced wheel.

Figure 4:
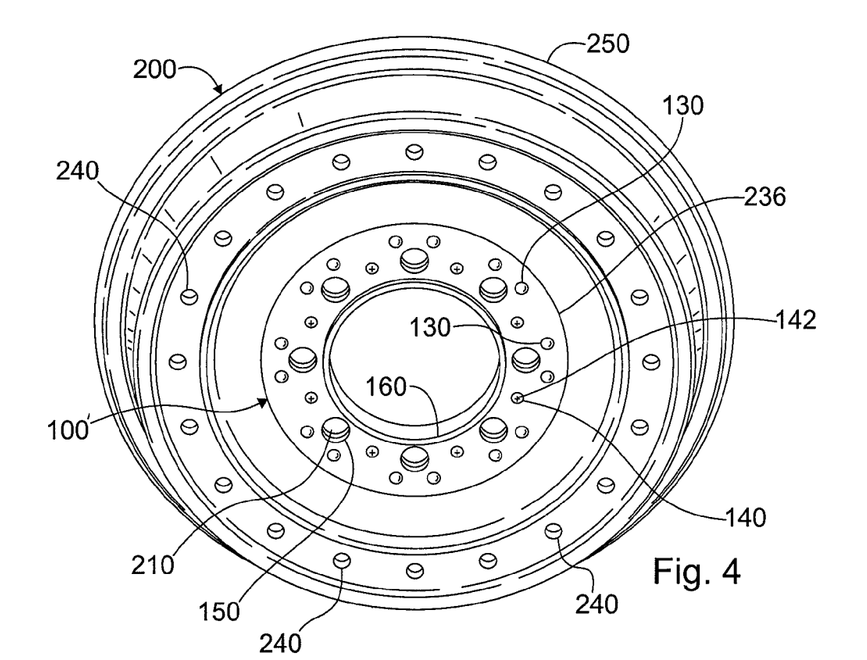
FIG. 4 is an example embodiment of a replacement wheel including a contact ring arrangement mounted to the hub-facing side thereof.
Figure 5A:
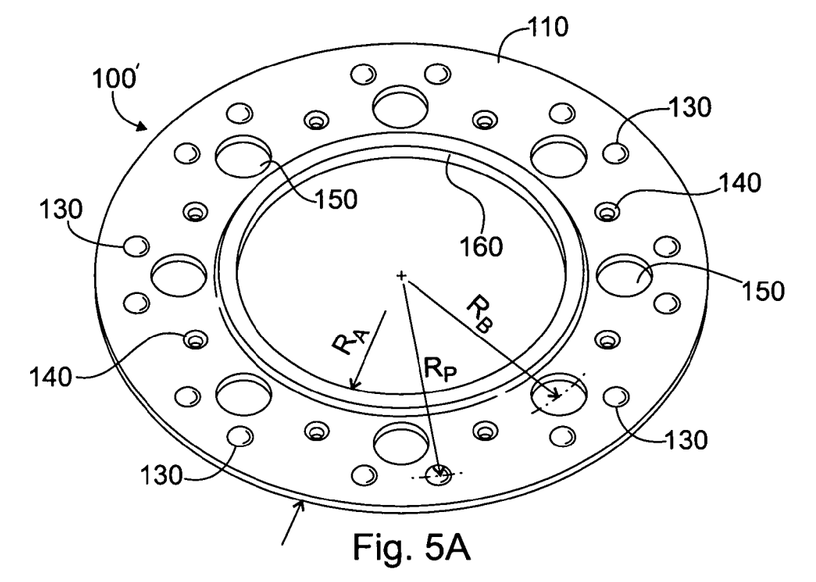
FIGS. 5A and 5B are views of a hub-facing side and of a wheel-facing side, respectively, of an example embodiment of a replacement wheel contact ring as for the replacement wheel 200 of FIG. 4.
Figure 5B:
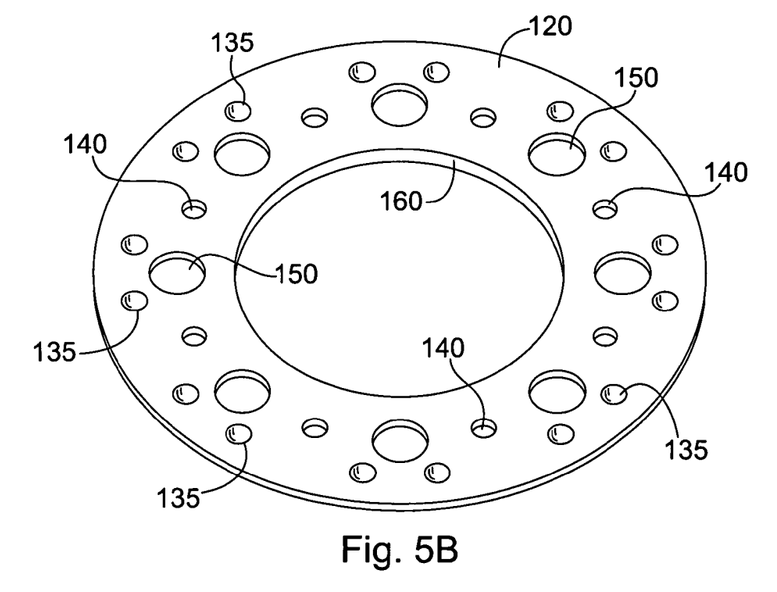

FIG. 4 is an example embodiment of a replacement wheel 200 including a contact ring arrangement 100' mounted to the hub-facing side 110 thereof, and FIGS. 5A and 5B are views of a hub-facing side 110 and of a wheel-facing side 120, respectively, of an example embodiment of a replacement wheel contact ring 100' as for the replacement wheel 200 of FIG. 4.

The illustrated example wheel disc 200 has eight mounting bolt holes 210 on a mounting bolt circle, has an inner mounting pad 220, and has contact ring arrangement 100 mounted concentrically thereon, e.g., by screws or bolts through holes 140. As a replacement wheel disc, wheel disc 200 has a pattern of mounting pads 130 in a circle thereon corresponding to the mounting pads of a wheel disc to be replaced. Example wheel disc 200 includes a flange 250 that provides a portion of a rim for providing lateral support for a tire mounted thereon and has a circle of bolt holes 240 through which bolts attaching a rim ring are fastened, thereby to provide a complete rim for wheel 200. Wheel discs of the type illustrated are typically used with Humvee type vehicles.

Replacement wheel contact ring 100' includes a mounting pad 130 arrangement substantially replicating the replaced wheel configuration and also includes features that correspond to other features of the replaced wheel. Contact ring 100' is wide enough to extend inward of the mounting bolt circle to include an inner mounting pad 160 in the form of a circular flange 160 at the central opening, as well as the outer mounting pads 130. Because contact ring 100' extends through the mounting bolt circle it has clearance holes 150 for the mounting bolts or threaded studs that attach the wheel 200 to the vehicle hub 300.

Replacement wheel contact ring 100' is a flat annular disc that has a plurality of raised mounting pads 130 in a predetermined pattern on a generally flat hub-facing side 110 thereof so as to substantially replicate the mounting pads of a replaced wheel, and is generally flat on the hub-facing side 120 thereof. Mounting pads 130 of contact ring 100' are in a pattern on a circle of radius Rp which is substantially the same radius of the circle on which the mounting pads of the replaced wheel are disposed. If mounting pads 130 are domed and are stamped, then a domed recess 135 results on the wheel side 120 of contact ring 100'.

Inner mounting pad 160 is a flange or boss projecting in a direction towards the vehicle hub when wheel 200 is mounted thereon, and of substantially the same diameter and extension as that of the replaced wheel, so as to substantially replicate the inner mounting pad of the replaced wheel, typically including a slight gap between inner mounting pad 160 and the surface of the vehicle hub. Inner mounting pad 160 may be stamped, e.g., if mounting pads 130 are stamped. Typically, the slight gap is about 0.05-0.5 mm (about 0.002-0.020 inch) and closes under dynamic loads to activate a stiffer Belleville spring type action than is provided by the Belleville spring action of the mounting bolt or lugs with outer mounting pads 130 which are the primary contacts with the vehicle hub. Contact ring 100' also includes eight mounting bolt holes 150 regularly spaced every 45° on a mounting bolt circle of radius Rb. Optionally, contact ring 100' includes, e.g., plural holes 140 through which screws, bolts, pins or rivets 142 may pass for attaching contact ring 100' to wheel disc 200.

The illustrated arrangement of mounting pads 130 and mounting bolt holes 150 on replacement wheel contact ring 100' is an example suitable for use with a wheel disc 200 having eight mounting bolt holes 210 and a hub having eight studs disposed every 45° around a mounting bolt circle of diameter 2Rb, (i.e. two times radius Rb), as is the case for a wheel for use on a Humvee vehicle. A Humvee hub and wheel disc have dimensions as set forth above. Ring 100' has an annular radial width Ra that is substantially larger than that of contact ring 100 of FIGS. 2A-2B so as to allow for mounting bolt holes 150 and inner mounting pad 160. Contact ring 100' has a thickness T that is sufficient to provide the desired strength and durability.

Illustrated example replacement wheel contact ring 100' is formed by stamping to form the pattern of mounting pads 130, mounting holes 150 and inner mounting pad 160, although a contact ring may be formed by stamping, embossing, punching, forging, machining, casting, or by any combination thereof. Stamping or embossing, for example, provides mounting pads 130 that may be relatively symmetrical and that tend to have a well-defined closed domed shape. As above, contact ring 100' may be of any material or combination of materials of suitable strength and durability. The example embodiment of FIGS. 4, and 5A-5B may be attached to a replacement wheel 200 by any suitable means, of which attachment screws, bolts, pins or rivets 142 passing through holes 140 are but examples.

One example replacement wheel contact ring 100' that is suitable for a Humvee wheel has a radius Rp of about 9.9 cm (about 3.9 inches), a mounting bolt circle diameter 2Rb of about 8.25 cm (about 3.25 inches), an annular radial width Ra of about 5;2 cm (about 2.0 inch) and a thickness of about 0.31 cm (about 0.125 inch), and is preferably made of stamped steel. Example contact ring is attached to a Humvee wheel disc by four flat-head screws 142.

Replacement wheel contact ring 100' when attached to the wheel disc 200 of the replacement wheel overcomes the problem of lug nuts that loosen in use by providing the replacement wheel 200 with substantially the same arrangement of mounting pads 130 as the replaced (e.g., original) wheel. As a result, the replacement wheel 200 with contact ring 100' will contact and bear against a vehicle hub at substantially the same locations as the replaced wheel, which locations are "clean" because they have been in surface-to-surface contact with the mounting pads of the replaced wheel.

Figure 6A:
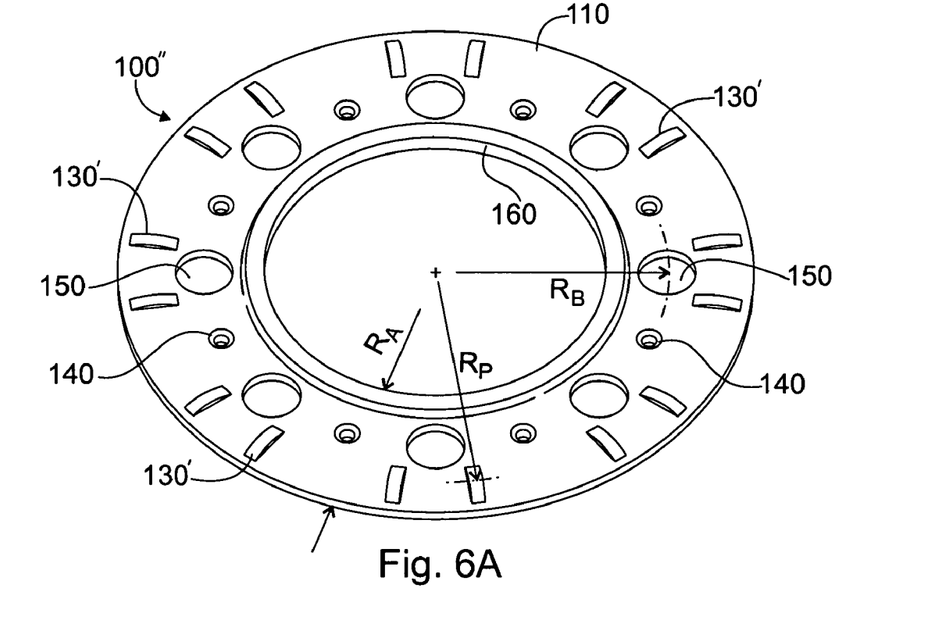
FIGS. 6A and 6B are views of a hub-facing side and of a wheel-facing side, respectively, of an example alternative embodiment of a replacement wheel contact ring as for the replacement wheel 200 of FIG. 4.
Figure 6B:
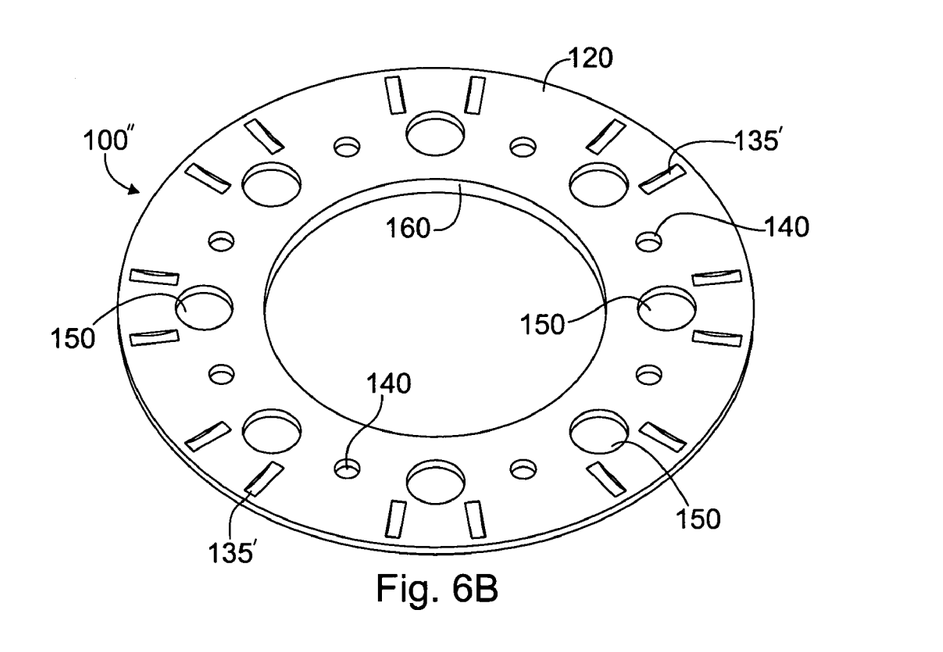

FIGS. 6A and 6B are views of a hub-facing side 110 and of a wheel-facing side 120, respectively, of an example alternative embodiment of a replacement wheel contact ring 100" as for the replacement wheel 200 of FIG. 4.

Replacement wheel contact ring 100" is like replacement wheel contact ring 100' of FIGS. 5A-5B except that the outer mounting pads 130' are formed by punching rather than by stamping or embossing. As a result, punched mounting pads 130' have sloped surfaces ramping to an apex and are generally triangular in shape when viewed from the edge. Because the punched metal forming sloped surfaces have parallel cuts along the sides thereof, mounting pads 130' have relatively sharp triangular shaped sides. If mounting pads 130' are punched, then a shaped recess 135' results on the wheel side 120 of contact ring 100".

In all other respects, replacement wheel contact ring 100" may be like replacement wheel contact ring 100' and may be of the same size and shape, of the same materials, and may be formed in like manner, except for the punching to form mounting pads 130'. The use, operation and advantage of replacement wheel contact rings 100, 100' and 100" are all as described herein.

Figure 7:
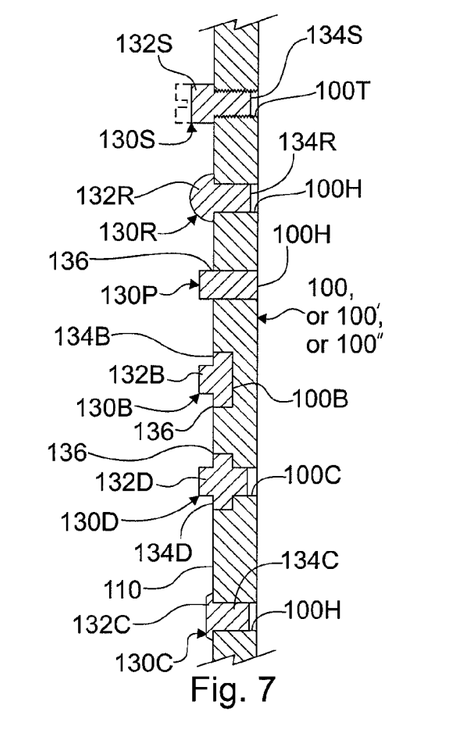
FIG. 7 is a cross-sectional view of alternative example embodiments of mounting pads on the hub-facing side of a replacement wheel contact ring.

FIG. 7 is a cross-sectional view of alternative example embodiments of mounting pads 130 on the hub-facing side 110 of a replacement wheel contact ring 100, 100', 100". Although mounting pads 130 may be provided by inserts of various types, shapes and sizes, it is usually preferred that inserts of the same type, shape and size be employed to provide all of the mounting pads 130" on any particular wheel disc 200'.

Mounting pad 130 may comprise a screw or bolt 130S having a threaded shank threaded into threaded hole 100T of contact ring 100, 100', 100". The underside of head 132S of screw 130S bears against hub-facing surface 110 so that head 132S provides a raised mounting pad 130, and, if head 132S is not of a suitable shape or size, head 132S may be machined or otherwise modified to provide a mounting pad 130 of the desired shape and size, either before or after screw or bolt 130S is threaded into hole 100T. Screw 130S may be a standard screw or bolt or may be a custom screw or bolt. Screw or bolt 130S need not have a head 132S of larger diameter than its shank 134S, and so could be a set screw or could be considered a threaded pin.

Mounting pad 130 may comprise a rivet 130R having a shank 134R pressed into hole 100H of contact ring 100, 100', 100". The underside of head 132R of rivet 130R bears against hub-facing surface 110 so that head 132R provides a raised mounting pad 130, and, if head 132R is not of a suitable shape or size, head 132R may be machined or otherwise modified to provide a mounting pad 130 of the desired shape and size, either before or after insertion of rivet 130R into hole 100H. Typically, button headed (illustrated) or cone headed rivets 130R may be employed, and rivet 130R may be a standard rivet or may be a custom rivet, preferably of hardened steel or another hard or hardened material.

Mounting pad 130 may comprise a pin 130P having a shank pressed into hole 100H of contact ring 100, 100', 100". The exposed end of pin 130P extends from hub-facing surface 110 to provide a raised mounting pad 130, and, if the exposed end of pin 130P is not of a suitable shape or size, it may be machined or otherwise modified to provide a mounting pad 130 of the desired shape and size, either before or after insertion of pin 130P into hole 100H. Typically, cylindrical pins 130P maybe employed, and pin 130P maybe a standard pin or may be a custom pin.

Mounting pad 130 may comprise a dual diameter insert 130B having a base 134B that is of larger diameter than is cylindrical head 132B and that is pressed into hole 100H of contact ring 100, 100', 100". The exposed end 132B of dual diameter insert 130B extends from hub-facing surface 110 to provide a raised mounting pad 130, and, if the exposed end of insert 130B is not of a suitable shape or size, it may be machined or otherwise modified to provide a mounting pad 130 of the desired shape and size, either before or after insertion of insert 130B into hole 100H. Typically, cylindrical inserts 130B may be employed, and insert 130B may be a standard insert or may be a custom insert.

Mounting pad 130 may comprise an insert 130D having a dual diameter base 134D that has a larger diameter base portion that is larger than the diameter of cylindrical head 132D and that is pressed into a larger diameter portion of counterbored dual diameter hole 100C of contact ring 100, 100', 100" and that has a smaller diameter base portion that is pressed into a smaller diameter portion of counterbored dual diameter hole 100C . The exposed end 132D of insert 130D extends from hub-facing surface 110 to provide a raised mounting pad 130, and, if the exposed end of insert 130D is not of a suitable shape or size, it may be machined or otherwise modified to provide a mounting pad 130 of the desired shape and size, either before or after insertion of insert 130D into hole 100H. Typically, cylindrical inserts 130D may be employed, and insert 130D may be a standard insert or may be a custom insert.

Mounting pad 130 may comprise a cone-headed rivet 130C having a shank pressed into hole 100H of contact ring 100, 100', 100". The underside of cone-shaped head 132C of rivet 130C bears against hub-facing surface 110 so that head 132C provides a raised mounting pad 130, and, if cone head 132C is not of a suitable shape or size, head 132C may be machined or otherwise modified to provide a mounting pad 130 of the desired shape and size, either before or after insertion of rivet 130C into hole 100H. Typically, cone-headed rivet 130C may be a standard rivet or may be a custom rivet, preferably of hardened steel or another hard or hardened material.

Inserts 130, for example, screws/bolts 130S, rivets 130R and 130C, pins 130P, may be longer than illustrated so as to extend through holes 100T, 100H and to protrude from annular ring 100. 100', 100" a sufficient distance to engage holes or recesses in a wheel or wheel disc 200 for positioning and/or attaching annular ring 100, 100', 100" thereto in a predetermined position.

Mounting pad inserts 130 (including rivets 130R and 130C) may be steel, and preferably may be a hardened steel, or other material of sufficient strength and hardness to withstand the forces and stress when the wheel or wheel disc is mounted to a hub. Any of mounting pad inserts 130 may be secured in the holes in the hub-facing surface 110 of the contact ring by screws 130S, by bolts 130S, by rivets 130R, by fasteners 130S, 130R, by adhesive 136, by welding 136, by brazing 136, by press fit, by slip fit, by swaging 136, by threading, by molding into a casting as an insert thereto, or by any other suitable means, or by any combination of the foregoing.

Figure 8:
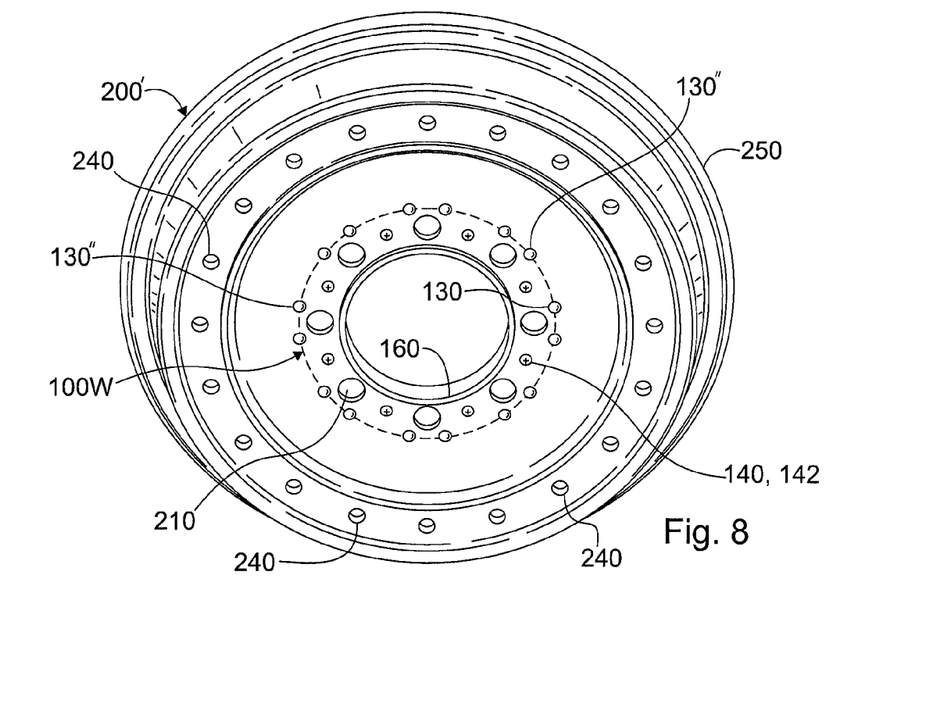
FIG. 8 is an example embodiment of a replacement wheel including a contact ring arrangement on the hub-facing side thereof.
Figure 9:
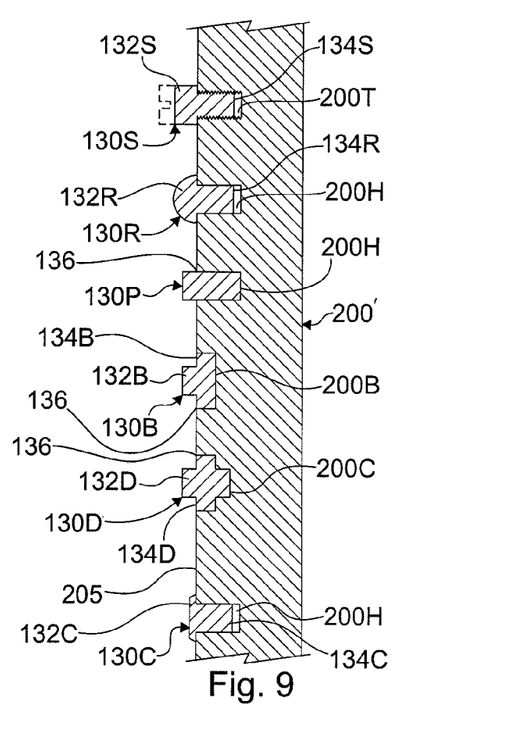
FIG. 9 is a cross-sectional view of alternative example embodiments of mounting pads on the hub-facing side of a replacement wheel.

FIG. 8 is an example embodiment of a replacement wheel 200' including a contact ring arrangement 100W on the hub-facing side thereof, and FIG. 9 is a cross-sectional view of alternative example embodiments of mounting pads 130" on the hub-facing side 205 of replacement wheel 200".

Wheel disc 200', which is substantially the same as wheel disc 200 described above, has a plurality of mounting pads 130" thereon arranged in a contact ring mounting pad circle 100W corresponding to the mounting pad arrangement of a wheel or wheel disc to be replaced. Mounting pads 130" comprise, for example, inserts disposed in holes in the hub-facing surface of wheel disc 200'. Although mounting pads 130" may be provided by inserts of various types, shapes and sizes, it is usually preferred that the inserts of the type, shape and size be employed to provide all of the mounting pads 130" on any particular wheel disc 200'.

Mounting pad 130" may comprise a screw or bolt 130S having a threaded shank threaded into threaded blind hole 200T of wheel disc 200'. The underside of head 132S of screw 130S bears against hub-facing surface 205 so that head 132S provides a raised mounting pad 130", and, if head 132S is not of a suitable shape or size, head 132S may be machined or otherwise modified to provide a mounting pad 130" of the desired shape and size, either before or after screw or bolt 130S is threaded into blind hole 200T. Screw 130S may be a standard screw or bolt or may be a custom screw or bolt. Screw or bolt 130S need not have a head 132S of larger diameter than its shank 134S, and so could be a set screw or could be considered a threaded pin.

Mounting pad 130" may comprise a rivet 130R having a shank pressed into blind hole 200H of contact ring 200'. The underside of head 132R of rivet 130R bears against hub-facing surface 205 so that head 132R provides a raised mounting pad 130", and, if head 132R is not of a suitable shape or size, head 132R may be machined or otherwise modified to provide a mounting pad 130" of the desired shape and size, either before or after insertion of rivet 130R into blind hole 200H. Typically, button headed (illustrated) or cone headed rivets 130R may be employed, and rivet 130R may be a standard rivet or may be a custom rivet, preferably of hardened steel or another hard or hardened material.

Mounting pad 130" may comprise a pin 130P having a shank pressed into blind hole 200H of wheel disc 200'. The exposed end of pin 130P extends from hub-facing surface 205 to provide a raised mounting pad 130", and, if the exposed end of pin 130P is not of a suitable shape or size, it may be machined or otherwise modified to provide a mounting pad 130" of the desired shape and size, either before or after insertion of pin 130P into blind hole 200H. Typically, cylindrical pins 130P may be employed, and pin 130P may be a standard pin or may be a custom pin.

Mounting pad 130" may comprise a dual diameter insert 130B having a base 134B that is of larger diameter than is cylindrical head 132B and that is pressed into blind hole 200B of wheel disc 200'. The exposed end 132B of dual diameter insert 130B extends from hub-facing surface 205 to provide a raised mounting pad 130", and, if the exposed end of insert 130B is not of a suitable shape or size, it may be machined or otherwise modified to provide a mounting pad 130" of the desired shape and size, either before or after insertion of insert 130B into blind hole 200B. Typically, cylindrical inserts 130B may be employed, and insert 130B may be a standard insert or may be a custom insert.

Mounting pad 130" may comprise an insert 130D having a dual diameter base 134D that has a larger diameter base portion that is larger than the diameter of cylindrical head 132D and that is pressed into a larger diameter portion of counterbored dual diameter blind hole 200C of wheel disc 200' and that has a smaller diameter base portion that is pressed into a smaller diameter portion of counterbored dual diameter blind hole 200C. The exposed end 132D of insert 130D extends from hub-facing surface 205 to provide a raised mounting pad 130", and, if the exposed end of insert 130D is not of a suitable shape or size, it may be machined or otherwise modified to provide a mounting pad 130" of the desired shape and size, either before or after insertion of insert 130D into counterbored blind hole 200C. Typically, cylindrical inserts 130D may be employed, and insert 130D may be a standard insert or may be a custom insert.

Mounting pad 130" may comprise a cone-headed rivet 130C having a shank 134C pressed into blind hole 200H of contact ring 200'. The underside of cone-shaped head 132C of rivet 130C bears against hub-facing surface 205 so that head 132C provides a raised mounting pad 130", and, if cone-shaped head 132C is not of a suitable shape or size, head 132C may be machined or otherwise modified to provide a mounting pad 130" of the desired shape and size, either before or after insertion of rivet 130C into blind hole 200H. Typically, rivet 130C may be a standard rivet or may be a custom rivet, preferably of hardened steel or another hard or hardened material.

Mounting pad inserts 130 (including rivets 130R and 130C) may be steel, and preferably may be a hardened steel, or other material of sufficient strength and hardness to withstand the forces and stress when the wheel or wheel disc is mounted to a hub. Any of mounting pad inserts 130" may be secured in blind holes 200T, 200H, 200B, 200C in the hub-facing surface of wheel disc 200 by screws 130S, by bolts 130S, by rivets 130R, by fasteners 130S, 130R, by adhesive 136, by welding 136, by brazing 136, by press fit, by slip fit, by swaging 136, by threading, by molding into a casting as an insert thereto, or by any other suitable means, or by any combination of the foregoing.

In a replacement wheel disc 200 that substantially replicates a mounting pad pattern of a wheel disc to be replaced, wherein the mounting pad pattern of the to-be-replaced wheel disc is located thereon proximate a circle of a first given diameter 2Rp, the replacement wheel disc 200 may comprise a wheel disc member 200 having mounting bolt holes 210 therein located on a mounting bolt circle of a second given diameter 2Rb, the wheel disc member 200 lacking a mounting pad pattern corresponding to the mounting pad pattern of the to-be-replaced wheel disc, an annular member 100, 100', 100" having an inner diameter less than the first given diameter of the mounting pad pattern of the to-be-replaced wheel disc and having an outer diameter greater than the first given diameter of the mounting pad pattern of the to-be-replaced wheel disc, the annular member 100, 100', 100" having a pattern of raised mounting pads 130, 130' located proximate a circle of the first given diameter 2Rp to substantially replicate the mounting pad pattern of the to-be-replaced wheel disc, wherein the annular member 100, 100', 100" is substantially concentrically located adjacent the wheel disc member. Annular member 100, 100', 100" may include steel, stainless steel, spring steel, titanium, aluminum, magnesium, a composite laminate, carbon reinforced composite, plastic, or any combination of the foregoing; or the wheel disc member 200 may include steel, stainless steel, spring steel, titanium, aluminum, magnesium, a composite laminate, carbon reinforced composite, plastic, or any combination of the foregoing; or any combination of any of the foregoing. The pattern of raised mounting pads 130, 160 in the annular member 100, 100', 100" to substantially replicate the mounting pad pattern of the to-be-replaced wheel disc may be provided by stamping, by embossing, by punching, by forging, by forming, by machining, by casting, by inserts, by threaded inserts, by pressed in inserts, by screws, by bolts, by pins, or by any combination of the foregoing. The wheel disc member 200 may be formed by stamping, by embossing, by punching, by forging, by machining, by casting, or by any combination of the foregoing. The inner diameter of the annular member 100, 100', 100" may be less than the second given diameter and the annular member 100, 100', 100" may have mounting bolt holes 150 on a mounting bolt circle of the second given diameter 2Rp and corresponding to the mounting bolt holes 210 of the wheel disc member 200. The inner diameter of the annular member 100, 100', 100" may be less than the second given diameter and the annular member 100, 100', 100" may have an inner mounting pad 160 corresponding to an inner mounting pad of the to-be-replaced wheel disc. The annular member 100, 100', 100" may be attached to the wheel disc member 200 by screws 142, by bolts 142, by rivets 142, by pins 142, by fasteners 142, by adhesive 236, by welding 236, by brazing 236, by press fit, by molding into a casting as an insert thereto, or by any combination of the foregoing, 142, 236. The to-be-replaced wheel disc may be a stamped wheel disc and the wheel disc member 200 may be aluminum or magnesium. The replacement wheel disc 200 may further comprise a rim member 250 affixed to the wheel disc member 200 to define a wheel. The pattern of raised mounting pads 130 in the annular member 100, 100', 100" to substantially replicate the mounting pad pattern of the to-be-replaced wheel disc may be provided by inserts 130, which inserts may include threaded inserts 130S, pressed in inserts 130R, 130P, 130B, 130D, screws 130S, bolts 130R, pins 130P, or any combination of the foregoing. The inserts 130 maybe secured in holes 100T, 100H, 100B, 100D in annular member 100, 100', 100" by screws 130S, by bolts 130S, by rivets 130R, by fasteners 130S, 130R, 130P, by adhesive, by welding, by brazing, by press fit, by slip fit, by swaging, by threading, by molding into a casting as an insert thereto, or by any combination of the foregoing.

In a replacement wheel disc 200' that substantially replicates a mounting pad pattern of a wheel disc to be replaced, wherein the mounting pad pattern 100W of the to-be-replaced wheel disc is located thereon proximate a circle of a first given diameter, the replacement wheel disc 200' may comprise a wheel disc member 200' having mounting bolt holes 210 therein located on a mounting bolt circle of a second given diameter, the wheel disc member 200' lacking a mounting pad pattern corresponding to the mounting pad pattern of the to-be-replaced wheel disc and having a hub-facing surface 205. An annular arrangement 100W of a pattern of raised mounting pad inserts 130" extends from the hub-facing surface 205 of wheel disc member 200', wherein annular arrangement 100W of raised mounting pad inserts 130" are located proximate a circle of the first given diameter to substantially replicate the mounting pad pattern of the to-be-replaced wheel disc. The annular arrangement 100W of a pattern of raised mounting pad inserts 130" is substantially concentrically located on the hub-facing surface 205 of wheel disc member 200'. Wheel disc member 200' may include steel, stainless steel, spring steel, titanium, aluminum, magnesium, a composite laminate, carbon reinforced composite, plastic, or any combination of the foregoing. The raised mounting pad inserts 130" in annular arrangement 100W to substantially replicate the mounting pad pattern of the to-be-replaced wheel disc may include inserts 130", threaded inserts 130S, pressed in inserts 130R, 130P, 130B, 130D, screws 130S, bolts 130S, pins 130P, or any combination of the foregoing. Wheel disc member 200' may be formed by stamping, by embossing, by punching, by forging, by machining, by casting, or by any combination of the foregoing. Mounting pad inserts 130" may be secured in blind holes 200T, 200H, 200B, 200D in the hub-facing surface 205 of wheel disc member 200' by screws 130S, by bolts 130S, by rivets 130R, by fasteners 130S, 130R, by adhesive, by welding, by brazing, by press fit, by slip fit, by swaging, by threading, by molding into a casting as an insert thereto, or by any combination of the foregoing. The to-be-replaced wheel disc may be a stamped wheel disc, wheel disc member 200 may be aluminum or magnesium, and mounting pad inserts 130" may be steel. Replacement wheel disc 200' may further comprise a rim member 260 affixed to wheel disc member 200' to define a wheel 200.

In a replacement wheel contact ring 100, 100', 100" for adapting a replacement wheel disc 200 to substantially replicate a mounting pad pattern of a wheel disc to be replaced, wherein the mounting pad pattern 130, 130' of the to-be-replaced wheel disc is located thereon proximate a circle of given diameter 2Rp, the replacement wheel contact ring 100, 100', 100" may comprise an annular member 100, 100', 100" having an inner diameter less than the given diameter 2Rp of the circle at which the mounting pad pattern 130, 130' of the to-be-replaced wheel disc is located and having an outer diameter greater than the given diameter of the circle at which the mounting pad pattern of the to-be-replaced wheel disc is located, the annular member 100, 100', 100" having a pattern of raised mounting pads located proximate a circle of the given diameter to substantially replicate the mounting pad pattern of the to-be-replaced wheel disc. Annular member 100, 100', 100" may include steel, stainless steel, spring steel, titanium, aluminum, magnesium, a composite laminate, carbon reinforced composite, plastic, or any combination of the foregoing. The pattern of raised mounting pads 130, 130' in annular member 100, 100', 100" proximate a circle of the given diameter 2Rp to substantially replicate the mounting pad pattern of the to-be-replaced wheel disc may provided by stamping, by embossing, by punching, by forging, by forming, by machining, by casting, by inserts, by threaded inserts, by pressed in inserts, by screws, by bolts, by pins, or by any combination of the foregoing. The inner diameter of annular member 100, 100', 100" may be less than a mounting bolt circle diameter 2Rb of the to-be-replaced wheel disc and annular member 100, 100' 100" may have mounting bolt holes 150 corresponding to mounting bolt holes of the to-be-replaced wheel disc located on substantially the same mounting bolt circle as the mounting bolt holes of the to-be-replaced wheel disc. The inner diameter of annular member 100, 100', 100" may be less than a mounting bolt circle diameter 2Rb of the to-be-replaced wheel disc and the annular member 100, 100', 100" may have an inner mounting pad 160 corresponding to an inner mounting pad of the to-be-replaced wheel disc. The annular member 100, 100', 100" may have a plurality of holes 140 therethrough for mounting to the replacement wheel disc. The annular member 100, 100', 100" may be attached to a wheel disc 200 by screws 142, by bolts 142, by rivets 142, by pins 142, by fasteners 142, by adhesive 236, by welding 236, by brazing 236, by press fit, by molding into a casting as an insert thereto, or by any combination of the foregoing, 142, 236. The pattern of raised mounting pads 130 in annular member 100, 100', 100" may be provided by inserts 130, which inserts 130 may include threaded inserts 130S, pressed in inserts 130P, 130B, 130D, screws 130S, bolts 130S, pins 130P, or any combination of the foregoing. Inserts 130 may be secured in holes 100T, 100H, 100D in annular member 100, 100', 100" by screws 130S, by bolts 130S, by rivets 130R, by fasteners 130S, 130R, by adhesive, by welding, by brazing, by press fit, by slip fit, by swaging, by threading, by molding into a casting as an insert thereto, or by any combination of the foregoing. Replacement wheel contact ring 100, 100', 100" may further comprise a replacement wheel disc 200, wherein the to-be-replaced wheel disc is a stamped wheel disc and wherein the replacement wheel disc 200 is aluminum or magnesium.

In a replacement object 200 that substantially replicates a mounting pad pattern of an object to be replaced, wherein the mounting pad pattern of the to-be-replaced object is located thereon proximate a circle of a first given diameter 2Rp, the replacement object 200 may comprise a first member 200 having mounting holes 210 therein located on a mounting bolt circle of a second given diameter 2Rb, the first member 200 lacking a mounting pad pattern corresponding to the mounting pad pattern of the to-be-replaced object, and an annular member 100, 100', 100" having an inner diameter less than the first given diameter 2Rp of the mounting pad pattern of the to-be-replaced object and having an outer diameter greater than the first given diameter 2Rp of the mounting pad pattern of the to-be-replaced object. Annular member 100, 100', 100" has a pattern of raised mounting pads 130 located proximate a circle of the first given diameter 2Rp to substantially replicate the mounting pad pattern of the to-be-replaced object, and annular member 100, 100', 100" is substantially concentrically located adjacent the first member 200. Annular member 100, 100', 100" may include steel, stainless steel, spring steel, titanium, aluminum, magnesium, a composite laminate, carbon reinforced composite, plastic, or any combination of the foregoing. The pattern of raised mounting pads in the annular member 100, 100', 100" to substantially replicate the mounting pad pattern of the to-be-replaced object may be provided by stamping, by embossing, by punching, by forging, by forming, by machining, by casting, by inserts, by threaded inserts, by pressed in inserts, by screws, by bolts, by pins, or by any combination of the foregoing. The inner diameter of annular member 100, 100', 100" may be less than the second given diameter 2Rb, and annular member 100, 100', 100" may have mounting bolt holes 150 on a mounting bolt circle of the second given diameter 2Rb and corresponding to the mounting bolt holes 210 of the first member 200 and may have an inner mounting pad 160 corresponding to an inner mounting pad of the to-be-replaced object. Annular member 100,100', 100" may be attached to the first member 200 by screws 142, by bolts 142, by rivets 142, by pins 142, by fasteners 142, by adhesive 236, by welding 236, by brazing 236, by press fit, by molding into a casting as an insert thereto, or by any combination of the foregoing, 142, 236. The pattern of raised mounting pads 130 in the annular member 100, 100', 100" to substantially replicate the mounting pad pattern of the to-be-replaced object may be provided by inserts 130, which inserts 130 may include threaded inserts 130S, pressed in inserts 130R, 130P, 130B, 130D, screws 130S, bolts 130S, pins 130P, or any combination of the foregoing. Inserts 130 may be secured in holes in annular member 100, 100', 100" by screws 130S, by bolts 130S, by rivets 130R, by fasteners 130S, 130R, by adhesive, by welding, by brazing, by press fit, by slip fit, by swaging, by threading, by molding into a casting as an insert thereto, or by any combination of the foregoing. The object may include a wheel disc 200.

As used herein, the term "about" means that specific dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that wheels, wheel discs and contact rings of very different sizes and dimensions may employ the described arrangements.

While the present invention has been described in terms of the foregoing example embodiments, variations within the scope and spirit of the present invention as defined by the claims following will be apparent to those skilled in the art. For example, replacement wheel contact ring 100, 100', 100" may be attached to a wheel or wheel disc by screws, bolts, rivets, or any other fastener, or by adhesives, welding, swaging, stamping, brazing, or may be pressed on or in, or may be molded into a casting as an insert thereto, or by any other suitable means, or by any combination of the foregoing.

While the terms "original wheel" and "replacement wheel" as used herein include and may refer to any wheel originally supplied with a vehicle by the manufacturer and any replacement wheel therefor, an "original wheel" and/or a "replaced wheel" and/or a "to-be-replaced wheel" includes and may be any wheel that is utilized on a vehicle at any time, irrespective of when, how and by whom provided, and a replacement wheel includes and may be any wheel that is to be mounted to a vehicle when a wheel thereon is removed for any reason, irrespective of time and location and of the source of either or both wheels.

Further, replacement wheel contact ring 100, 100', 100" may be formed of steel, stainless steel, spring steel, titanium, aluminum, magnesium, a composite laminate, carbon reinforced composite, plastic, or any other material having suitable strength and durability considering the particular application and environment to which the particular contact ring 100, 100', 100" may be exposed.

Further, the mounting pads and/or inserts providing mounting pads may be of any desired shape, examples of which may include spherical, elliptical, cylindrical, pyramidal, domed, triangular, rectangular, square, hexagonal, octagonal, and the like, and certain types of inserts, such as pressed in pins and threaded pins, for example, may be inserted from the hub-facing side or from the wheel-facing side of contact ring 100, 100', 100" or wheel disc 200', as appropriate.

While the replacement wheel contact rings 100, 100', 100" are described herein as addressing a problem often occurring with aluminum or magnesium replacement wheels and wheel discs, contact rings 100, 100', 100" may be employed, e.g., with a steel wheel disc or wheel to increase the springiness of its mounting on a vehicle hub, in which case contact rings 100, 100', 100" may be of spring steel. The wheels and wheel discs described herein may be attached to a vehicle hub, a brake drum, a brake rotor, another wheel or wheel disc (as in a dual or plural wheel assembly), or any other wheel mounting member, all of which are encompassed by the term hub. Further, wheel encompasses any wheel and/or wheel assembly, e.g., a dual wheel.

In addition, the arrangement described is not limited to the example embodiment of adapting a replacement wheel to substantially replicate the mounting pad pattern of a replaced wheel, but may be employed for adapting any replacement object to substantially replicate the partial surface contacting arrangement of any replaced object that does not make full surface contact with the object to which it is mounted, whereby dirt, debris or other contamination may accumulate on the mounting surface.

Finally, numerical values stated are typical or example values, and are not limiting values. For example, while the example herein utilizes eight mounting bolts on a bolt circle of a particular diameter, bolt circles employing different numbers of bolts and/or different diameters may be employed.

What is claimed is:

1. A replacement wheel disc that substantially replicates a mounting pad pattern of a wheel disc to be replaced, wherein the mounting pad pattern of the to-be-replaced wheel disc is located proximate a circle of a first given diameter on the to-be-replaced wheel disc, said replacement wheel disc comprising:
   a wheel disc member having mounting bolt holes therein located on a mounting bolt circle of a second given diameter, said wheel disc member lacking a mounting pad pattern corresponding to the mounting pad pattern of the to-be-replaced wheel disc;
   an annular member having an inner diameter less than the first given diameter of the mounting pad pattern of the to-be-replaced wheel disc and having an outer diameter greater than the first given diameter of the mounting pad pattern of the to-be-replaced wheel disc, said annular member having a pattern of raised mounting pads located proximate a circle of the first given diameter to substantially replicate the mounting pad pattern of the to-be-replaced wheel disc;
   wherein said annular member is substantially concentrically located adjacent said wheel disc member,
   whereby the replacement wheel disc has a pattern of raised mounting pads provided by said annular member that substantially replicates the mounting pad pattern of the to-be-replaced wheel disc.

2. The replacement wheel disc of claim 1:
   wherein said annular member includes at least one material selected from steel, stainless steel, spring steel, titanium, aluminum, magnesium, a composite laminate, carbon reinforced composite, and plastic; or
   wherein said wheel disc member includes at least one material selected from steel, stainless steel, spring steel, titanium, aluminum, magnesium, a composite laminate, carbon reinforced composite, ans plastic; or
   any combination of any of the foregoing.

3. The replacement wheel disc of claim 1:
   wherein the pattern of raised mounting pads in the annular member to substantially replicate the mounting pad pattern of the to-be-replaced wheel disc is provided by stamping, by embossing, by punching, by forging, by forming, by machining, by casting, by inserts, by threaded inserts, by pressed in inserts, by screws, by bolts, by rivets, or by pins; or
   wherein the wheel disc member is formed by stamping, by embossing, by punching, by forging, by machining, or by casting; or
   any combination of any of the foregoing.

4. The replacement wheel disc of claim 1 wherein the inner diameter of said annular member is less than the second given diameter, said annular member having mounting bolt holes on a mounting bolt circle of the second given diameter and corresponding to the mounting bolt holes of said wheel disc member.

5. The replacement wheel disc of claim 1 wherein the inner diameter of said annular member is less than the second given diameter, said annular member having an inner mounting pad corresponding to an inner mounting pad of the to-be-replaced wheel disc.

6. The replacement wheel disc of claim 1 wherein said annular member is attached to said wheel disc member by screws, by bolts, by rivets, by pins, by fasteners, by adhesive, by welding, by brazing, by press fit, by molding into a casting as an insert thereto, or by a combination of the foregoing.

7. The replacement wheel disc of claim 1 wherein the to-be-replaced wheel disc is a stamped wheel disc and wherein said wheel disc member is aluminum or magnesium.

8. The replacement wheel disc of claim 1 further comprising a rim member affixed to said wheel disc member, said wheel disc member and said rim member defining a wheel.

9. The replacement wheel disc of claim 1
   wherein the pattern of raised mounting pads in the annular member to substantially replicate the mounting pad pattern of the to-be-replaced wheel disc is provided by inserts, said inserts including threaded inserts, pressed in inserts, screws, bolts, rivets, pins, or a combination of the foregoing; and
   wherein the pattern of raised mounting pads in the annular member to substantially replicate the mounting pad pattern of the to-be-replaced wheel disc is provided by inserts secured in holes in said annular member by adhesive, by welding, by brazin, by press fit, by slip fit, by swaging, by threading, by molding into a casting as an insert thereto, or by a combination of the foregoing.

10. A replacement wheel disc that substantially replicates a mounting pad pattern of a wheel disc to be replaced, wherein the mounting pad pattern of the to-be-replaced wheel disc is located proximate a circle of a first given diameter, on the to-be-replaced wheel disc, said replacement wheel disc comprising:
    a wheel disc member having mounting bolt holes therein located on a mounting bolt circle of a second given diameter, said wheel disc member lacking a mounting pad pattern corresponding to the mounting pad pattern of the to-be-replaced wheel disc, said wheel disc member having a hub-facing surface;
    an annular arrangement of a pattern of raised mounting pad inserts extending from the hub-facing surface of said wheel disc member, wherein said annular arrangement of raised mounting pad inserts are located proximate a circle of the first given diameter to substantially replicate the mounting pad pattern of the to-be-replaced wheel disc;
    wherein said annular arrangement of a pattern of raised mounting pad inserts is substantially concentrically located on the hub-facing surface of said wheel disc member,
    whereby the replacement wheel disc has a pattern of raised mounting pads provided by said annular arrangement of inserts that substantially replicates the mounting pad pattern of the to-be-replaced wheel disc.

11. The replacement wheel disc of claim 10 wherein said wheel disc member includes at least one material selected from steel, stainless steel, spring steel, titanium, aluminum, magnesium, a composite laminate, carbon reinforced composite, and plastic.

12. The replacement wheel disc of claim 10:
    wherein the raised mounting pad inserts in the annular member to substantially replicate the mounting pad pattern of the to-be-replaced wheel disc and include inserts, threaded inserts, pressed in inserts, screws, bolts, rivets, pins, or a combination of the foregoing; or wherein the wheel disc member is formed by stamping, by embossing, by punching, by forging, by machining, or by casting; or any combination of any of the foregoing.

13. The replacement wheel disc of claim 10 wherein said mounting pad inserts are secured in blind holes in the hub-facing surface of said wheel disc member by adhesive, by welding, by brazing, by press fit, by slip fit, by swaging, by threading, or by molding into a casting as an insert thereto, or by a combination of the foregoing.

14. The replacement wheel disc of claim 10 wherein the to-be-replaced wheel disc is a stamped wheel disc, wherein said wheel disc member is aluminum or magnesium, and wherein said mounting pad inserts are steel.

15. The replacement wheel disc of claim 10 further comprising a rim member affixed to said wheel disc member, said wheel disc member and said rim member defining a wheel.

16. A replacement wheel contact ring for adapting a replacement wheel disc to substantially replicate a mounting pad pattern of a wheel disc to be replaced, wherein the mounting pad pattern of the to-be-replaced wheel disc is located proximate a circle of given diameter on the to-be-replaced wheel disc, said replacement wheel contact ring comprising:

an annular member having an inner diameter less than the given diameter of the circle at which the mounting pad pattern of the to-be-replaced wheel disc is located and having an outer diameter greater than the given diameter of the circle at which the mounting pad pattern of the to-be-replaced wheel disc is located, said annular member having a pattern of raised mounting pads located proximate a circle of the given diameter to substantially replicate the mounting pad pattern of the to-be-replaced wheel disc, whereby a replacement wheel disc in combination with said annular member provides a wheel disc having a pattern of raised mounting pads that substantially replicates the mounting pad pattern of the to-be-replaced wheel disc.

17. The replacement wheel contact ring of claim 16 wherein said annular member includes at least one material selected from steel, stainless steel, spring steel, titanium, aluminum, magnesium, a composite laminate, carbon reinforced composite, and plastic.

18. The replacement wheel contact ring of claim 16 wherein the pattern of raised mounting pads located proximate a circle of the given diameter to substantially replicate the mounting pad pattern of the to-be-replaced wheel disc is provided by stamping, by embossing, by punching, by forging, by forming, by machining, by casting, by inserts, by threaded inserts, by pressed in inserts, by screws, by bolts, the rivets, or by pins.

19. The replacement wheel contact ring of claim 16 wherein the inner diameter of said annular member is less than a mounting bolt circle diameter of the to-be-replaced wheel disc, said annular member having mounting bolt holes corresponding to mounting bolt holes of the to-be-replaced wheel disc located on substantially the same mounting bolt circle as the mounting bolt holes of the to-be-replaced wheel disc.

20. The replacement wheel contact ring of claim 16 wherein the inner diameter of said annular member is less than a mounting bolt circle diameter of the to-be-replaced wheel disc, said annular member having an inner mounting pad corresponding to an inner mounting pad of the to-be-replaced wheel disc.

21. The replacement wheel contact ring of claim 16 wherein said annular member has a plurality of holes therethrough for mounting to the replacement wheel disc.

22. The replacement wheel contact ring of claim 16 wherein said annular member is attached to a wheel disc by screws, by bolts, by rivets, by pins, by fasteners, by adhesive, by welding, by brazing, by press fit, by molding into a casting as an insert thereto, or by a combination of the foregoing.

23. The replacement wheel contact ring of claim 16:
wherein the pattern of raised mounting pads in the annular member is provided by inserts, said inserts including threaded inserts, pressed in inserts, screws, bolts, rivets, pins, or a combination of the foregoing; or
wherein the pattern of raised mounting pads in the annular member is provided by inserts secured in holes in said annular member by adhesive, by welding, by brazing, by press fit, by slip fit, by swaging, by threading, by molding into a casting as an insert thereto, or by a combination of the foregoing.

24. The replacement wheel contact ring of claim 16 further comprising a replacement wheel disc, wherein the to-be-replaced wheel disc is a stamped wheel disc and wherein said replacement wheel disc is aluminum or magnesium.

25. A replacement object that substantially replicates a mounting pad pattern of an object to be replaced, wherein the mounting pad pattern of the to-be-replaced object is located proximate a circle of a first given diameter on the to-be-replaced object, said replacement object comprising:

a first member having mounting holes therein located on a mounting bolt circle of a second given diameter, said first member lacking a mounting pad pattern corresponding to the mounting pad pattern of the to-be-replaced object;

an annular member having an inner diameter less than the first given diameter of the mounting pad pattern of the to-be-replaced object and having an outer diameter greater than the first given diameter of the mounting pad pattern of the to-be-replaced object, said annular member having a pattern of raised mounting pads located proximate a circle of the first given diameter to substantially replicate the mounting pad pattern of the to-be-replaced object;

wherein said annular member is substantially concentrically located adjacent said first member, whereby the replacement object has a pattern of raised mounting pads provided by said annular member that substantially replicates the mounting pad pattern of the to-be-replaced object.

26. The replacement object of claim 25:
wherein said annular member includes at least one material selected from steel, stainless steel, spring steel, titanium, aluminum, magnesium, a composite laminate, carbon reinforced composite, and plastic; and
wherein the pattern of raised mounting pads in the annular member to substantially replicate the mounting pad pattern of the to-be-replaced object is provided by stamping, by embossing, by punching, by forging, by forming, by machining, by casting, by inserts, by threaded inserts, by pressed in inserts, by screws, by bolts, by rivets, or by pins.

27. The replacement object of claim 25 wherein the inner diameter of said annular member is less than the second given diameter, said annular member having mounting bolt holes on a mounting bolt circle of the second given diameter and corresponding to the mounting bolt holes of said first member and having an inner mounting pad corresponding to an inner mounting pad of the to-be-replaced object.

28. The replacement object of claim 25 wherein said annular member is attached to said first member by screws, by bolts, by rivets, by pins, by fasteners, by adhesive, by welding, by brazing, by press fit, or by molding into a casting as an insert thereto, or by a combination of the foregoing.

29. The replacement object of claim 25:

wherein the pattern of raised mounting pads in the annular member to substantially replicate the mounting pad pattern of the to-be-replaced object is provided by inserts, said inserts including threaded inserts, pressed in inserts, screws, bolts, rivets, pins, or a combination of the foregoing; or wherein the pattern of raised mounting pad in the annular member to substantially replicate the mounting pad pattern of the to-be-replaced object is provided by inserts secured in holes in said annular member by adhesive, by welding, by brazing, by press fit, by slip fit, by swaging, by threading, by molding into a casting as an insert thereto, or by a combination of the foregoing.

30. The replacement object of claim 25 wherein said object includes a wheel disc.

\* \* \* \* \*